United States Patent [19]

Linde et al.

[11] Patent Number: 4,922,692

[45] Date of Patent: May 8, 1990

[54] METHOD OF CONDITIONING FORAGE CROPS

[75] Inventors: Gilbert W. Linde; Shaun A. Seymour; Emmett G. Webster, all of New Holland, Pa.

[73] Assignee: Ford New Holland, Inc., New Holland, Pa.

[21] Appl. No.: 324,790

[22] Filed: Mar. 17, 1989

[51] Int. Cl.$^5$ ............................................. A01D 91/00
[52] U.S. Cl. ..................... 56/1; 56/DIG. 2
[58] Field of Search ............... 56/1, 16.4, DIG. 1, 56/DIG. 2, DIG. 23; 100/70 A; 176; 34/127; 29/121.1, 121.2

[56] References Cited

U.S. PATENT DOCUMENTS

| | | | |
|---|---|---|---|
| 2,464,974 | 3/1949 | Garvey | 56/DIG. 1 |
| 3,043,073 | 7/1962 | Bornzin | 56/DIG. 1 |
| 3,488,929 | 1/1970 | Hale | 56/1 |
| 3,513,645 | 5/1970 | Garrett et al. | 56/1 |
| 3,712,034 | 1/1973 | Praca | 56/DIG. 1 |
| 3,854,974 | 12/1974 | Sato et al. | 100/176 |
| 3,890,770 | 6/1975 | Milliken | 56/DIG. 1 |
| 4,035,991 | 7/1977 | Oosterling et al. | 56/1 |
| 4,172,353 | 10/1979 | Meek et al. | 56/DIG. 1 |
| 4,216,641 | 8/1980 | Koch et al. | 56/DIG. 1 |
| 4,446,678 | 5/1984 | Smith | 56/DIG. 1 |
| 4,472,927 | 9/1984 | Vogt et al. | 56/16.4 |
| 4,516,392 | 5/1985 | McLean et al. | 56/16.4 |

FOREIGN PATENT DOCUMENTS

| | | | |
|---|---|---|---|
| 1183297 | 12/1964 | Fed. Rep. of Germany | 56/DIG. 1 |
| 0217110 | 8/1968 | U.S.S.R. | 56/DIG. 1 |
| 0686661 | 10/1969 | U.S.S.R. | 56/DIG. 1 |

Primary Examiner—Jerome W. Massie
Assistant Examiner—Terry Lee Melius
Attorney, Agent, or Firm—Larry W. Miller; Frank A. Seemar; Darrell F. Marquette

[57] ABSTRACT

A method of conditioning forage crops utilizing a pair of counterrotating conditioning rolls mounted in a hay harvesting machine is disclosed wherein at least one of the conditioning rolls is transversely reciprocated relative to the other conditioning roll. An oscillating mechanism is provided to effect the transverse reciprocating movement of the conditioning rolls. The method of conditioning can be accomplished by a conditioning mechanism in which the entire conditioning roll is transversely reciprocated while being rotated or by a conditioning roll in which individual lobes circumferentially mounted for transverse reciprocation around the conditioning roll core effect the sliding action while being rotated.

15 Claims, 8 Drawing Sheets

METHOD OF CONDITIONING FORAGE CROPS

BACKGROUND OF THE INVENTION

The present invention relates generally to hay harvesting machines and, more particularly, to a method of conditioning forage crops, such as hay, to accelerate the drying time between cutting and baling the crop.

Hay harvesting machine commonly referred to as mower-conditioners or windrowers, utilize a crop harvesting header to sever the hay crop from the ground and convey it rearwardly to a conditioning mechanism operable to crush or crimp the severed crop material at spaced apart intervals along the stem of the crop to facilitate the drainage of liquids from the crop material plant. Conditioning mechanisms of the type utilizing a pair of counterrotating, intermeshing conditioning rolls are provided with transversely extending flutes to effect conditioning of the severed crop material in a manner described in greater detail in U.S. Pat. No. 3,488,929 issued to J. K. Hale.

Although the individual crop material plant, which generally has a waxy stem, has been broken in several places by the operation of the intermeshing flutes on the conditioning rolls, the liquids within the plant still require significant time to escape from the plant to permit satisfactory conditions in which the dried crop material can be baled and then removed from the field. A more rapid drying of liquids from the conditioned crop material could be obtained if the waxy stem of the crop material plant were split along the length thereof, providing a ready means for the liquid to escape from the plant.

Accordingly, it would be desireable to provide a method of conditioning a forage crop that could provide a more aggressive and extensive conditioning of the harvested crop material to decrease the length of time required to lower the moisture content of the conditioned crop material so that the crop can be collected and removed from the field without the use of chemical treatment to accelerate the drying process.

SUMMARY OF THE INVENTION

It is an object of this invention to overcome the aforementioned disadvantages of the prior art by providing a method of conditioning forage crops utilizing a pair of counterrotating conditioning rolls in which at least one of the conditioning rolls is transversely reciprocal relative to the other.

It is another object of this invention to provide a method of conditioning forage crops via a sliding action between counterrotating conditioning rolls.

It is a feature of this invention that the method of conditioning is operable to condition crop material along regular intervals by crimping the crop material between counterrotating conditioning rolls, as well to effect a conditioning of the crop material by a sliding action between the conditioning rolls.

It is an advantage of this invention that the time required to effect a drying of the conditioned crop material is substantially reduced.

It is another feature of this invention that both counterrotating conditioning rolls can be simultaneously tranversely oscillated.

It is still another object of this invention to provide a method of conditioning forage crop that can be accomplished by a conditioning mechanism in which the entire conditioning roll is transversely reciprocated or by a conditioning mechanism in which individual lobes on the conditioning roll are slidably mounted for reciprocal movement.

It is another advantage of this invention that the method of conditioning forage crop can utilize counterbalancing reciprocal movements.

It is still another advantage of this invention that superior conditioning of crop material can be obtained.

It is yet another object of this invention to provide a method of conditioning forage crops that can be utilized on a standard hay harvesting machine.

It is a further object of this invention to provide a method of conditioning forage crops which can be simply and effectively used.

These and other objects, features and advantages are accomplished according to the instant invention by providing a method of conditioning forage crops utilizing a pair of counterrotating conditioning rolls mounted in a hay harvesting machine wherein at least one of the conditioning rolls is transversely reciprocated relative to the other conditioning roll. An oscillating mechanism is provided to effect the transverse reciprocating movement of the conditioning rolls. The method of conditioning can be accomplished by a conditioning mechanism in which the entire conditioning roll is transversely reciprocated while being rotated or by a conditioning roll in which individual lobes circumferentially mounted for transverse reciprocation around the conditioning roll core effect the sliding action while being rotated.

BRIEF DESCRIPTION OF THE DRAWINGS

The advantages of this invention will become apparent upon consideration of the following disclosure of the invention, especially when taken in conjunction with the accompanying drawings wherein.

DETAILED DESCRIPTION OF THE PREFERRED EMBODIMENT

Figure 1:
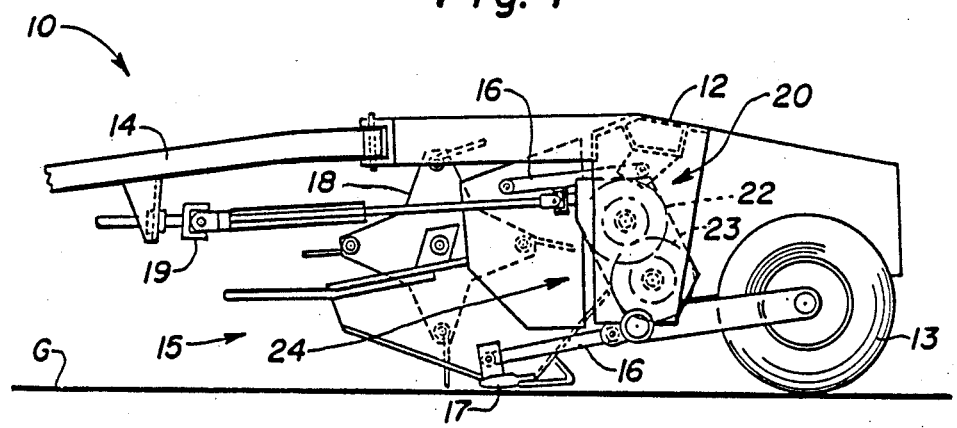
FIG. 1 is a side elevational view of a hay harvesting machine incorporating the principles of the instant invention.
Figure 2:
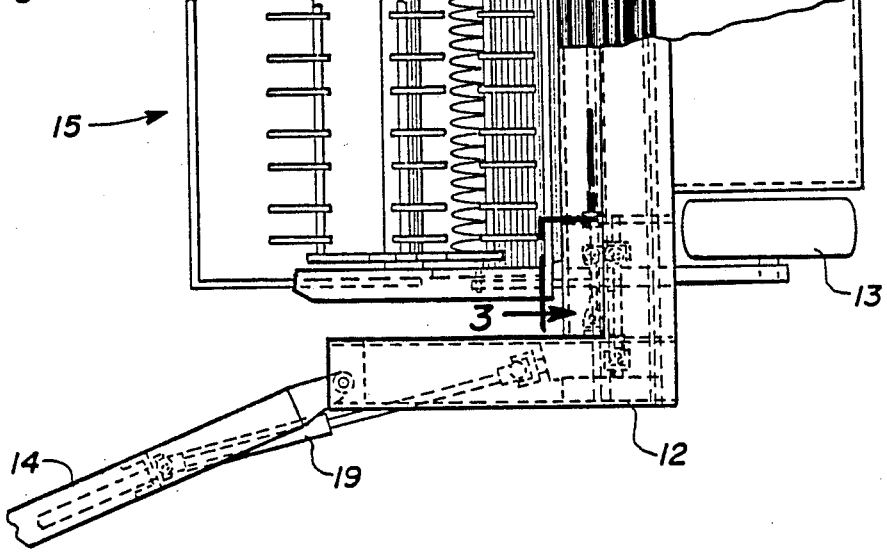
FIG. 2 is a top plan view of the hay harvesting machine seen in FIG. 1 with the center section thereof broken away for purposes of clarity.

Referring now to the drawings and, particularly, to FIGS. 1 and 2, a hay harvesting machine, commonly referred to as a pull-type mower-conditioner, incorporating the principles of the instant invention, can best be seen. Any left and right references are used as a matter of convenience and are determined by standing at the rear of the machine, facing the forward end, of the direction of travel.

The mower-conditioner 10 is provided with a frame 12 adapted for mobile movement over the ground G by wheels 13 rotatably mounted thereon. The frame 12 is provided with a pivotal draw bar 14 which extends forwardly therefrom for connection to a prime mover, such as a tractor, in a conventional manner. The frame 12 supports a header 15 by flotation linkage 16 for generally vertical movement relative to the ground G as is conventionally known. The header 15 includes a conventional cutter bar 17 operable to sever standing crop material from the ground G and a reel 18 rotatably operable in a conventional manner to convey the severed crop material rearwardly to the conditioning mechanism 20. The drive mechanism 19 is supported from the draw bar 14 and the frame 12 to transfer rotational power from the prime mover in a conventional manner to the operable components of the mower-conditioner 10.

Figure 7:
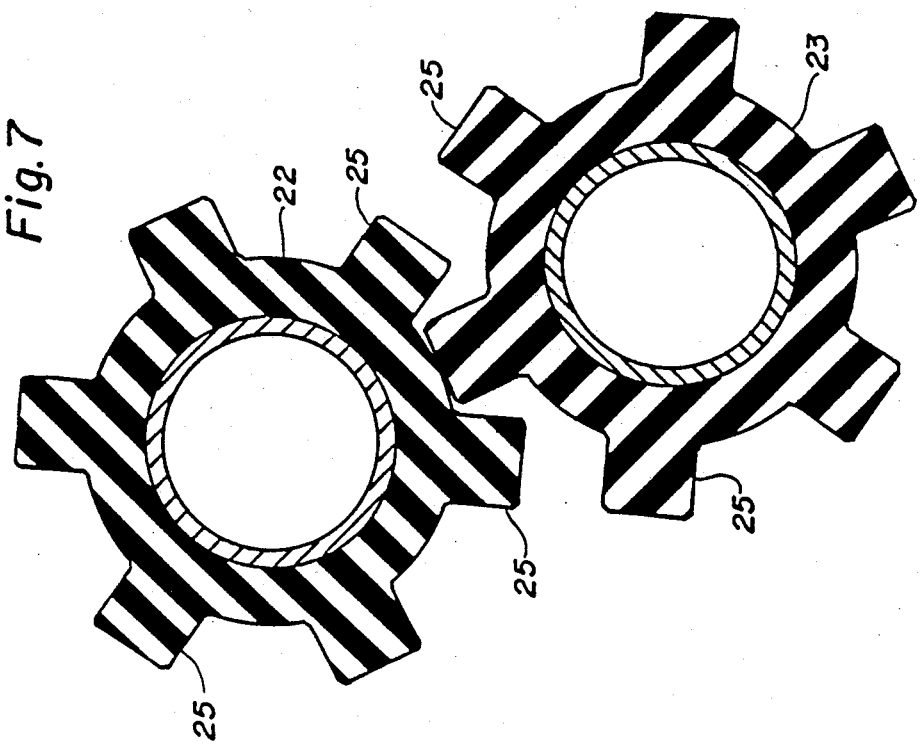
FIG. 7 is a view similar to that shown in FIG. 6 depicting a second embodiment of the conditioning roll profile.
Figure 6:
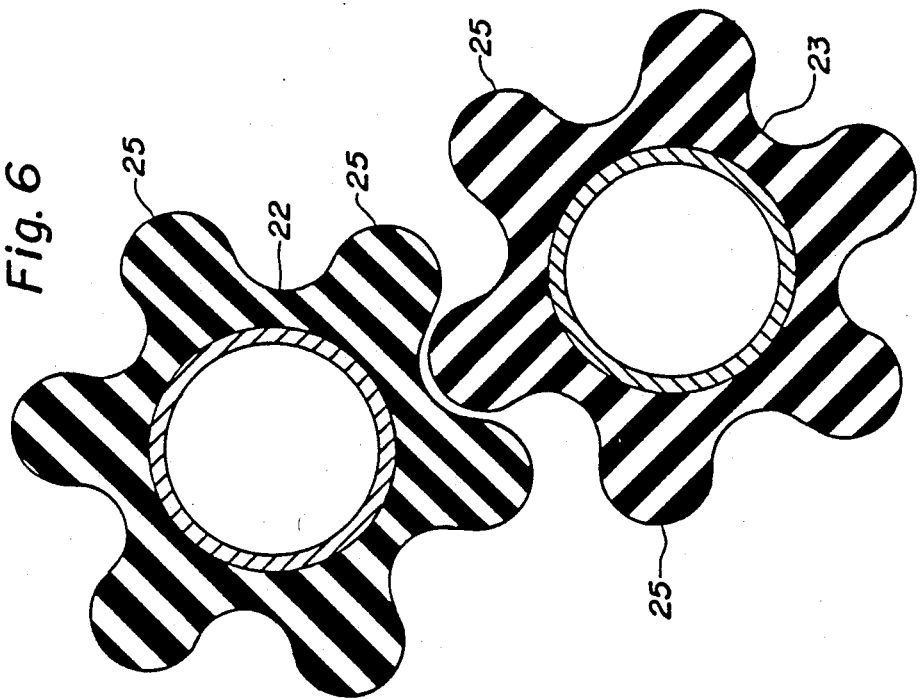
FIG. 6 is a schematic vertical cross-sectional view taken through the conditioning roll mechanism to represent a first embodiment of a conditioning roll profile.

The conditioning mechanism 20 is shown rotatably mounted in the frame 12 rearwardly of the header 15 to receive severed crop material conveyed rearwardly therefrom by the reel 18. The conditioning mechanism 20 is provided with an upper roll 22 and a counterrotating lower roll 23 positioned for intermeshing engagement therewith to define a throat 24 into which the severed crop material is fed so as to pass between the counterrotating conditioning rolls 22, 23. As depicted in FIGS. 2, 6 and 7, each conditioning roll is provided with a plurality of circumferentially spaced flutes or lugs 25 extending transversely along the exterior surface of the conditioning rolls 22,23.

The conditioning roll profile depicted in FIG. 6, due to the arcuate configuration of the individual intermeshing flutes 25, provides a substantially continuous crushing of the crop material as it passes through the throat 24 substantially tangential to the conditioning rolls 22, 23. Alternatively, the individual flutes 25 could have an angular shape as depicted in FIG. 7 so as to provide crimping points at the bends of the flutes 25 to effect a conditioning of the crop material passing through the throat 24 along substantially regular intervals as the crop material passes generally tangentially to the conditioning rolls 22, 23 in addition to the sliding conditioning action of the reciprocating conditioning rolls described in greater detail below.

To effect an even greater conditioning of the crop material passing through the throat 24 between the conditioning rolls 22, 23, at least one of the conditioning rolls, such as the lower conditioning roll 23 can be adapted for transverse linear movement relative to the other conditioning roll, such as the upper roll 22, as will be described below. While the drive mechanism 19 is causing a counterrotative movement of the respective conditioning rolls 22, 23, through the universal joint drive couplings 27, 29, an oscillating mechanism 30, shown in the form of a hydraulic cylinder 31 connected to the lower conditioning roll 23 by means of a thrust bearing 32, effects the transverse reciprocating movement of the lower conditioning roll 23.

The lower conditioning roll 23 is provided with opposing, outwardly extending axial shafts 33 which are rotatably mounted in the side sheets 34 of the frame 12 and extend outwardly therefrom in both directions for connection with the universal joint drive coupling 29 and the thrust bearing 32, respectively. The upper roll 22 is rotatably mounted in a pair of swing arms 36 operably associated with a conventional biasing mechanism (not shown) to urge the upper roll 22 into intermeshing engagement with the lower roll 23; however, the swing arms 36 permit the upper roll 22 to move away from the lower roll 23 within the slots 38 formed in the side sheets 34 to permit the passage of slugs or clumps of crop material through the throat 24.

Because of the transversely oriented intermeshed flutes 25 on the conditioning rolls 22, 23 and the relative sliding action created by the transversely linearly movable mower-conditioning roll 23, it is necessary that the drive to the conditioning rolls 22, 23 be timed to maintain the proper intermeshed relationship between the respective conditioning lugs 25. The reciprocal movement of the lower conditioning roll 23 is indicated by the phantom line adjacent the right side sheet 34. The transverse movement of the shaft 33 can be accomodated by the telescopical universal joint drive coupling 29 attached to the drive mechanism 19. The timing of the stroke of the hydraulic cylinder 31 is preferably automatically controlled either mechanically or through the means of a microprocessor to control the flow of hydraulic fluid to the hydraulic cylinder 31.

Figure 3:
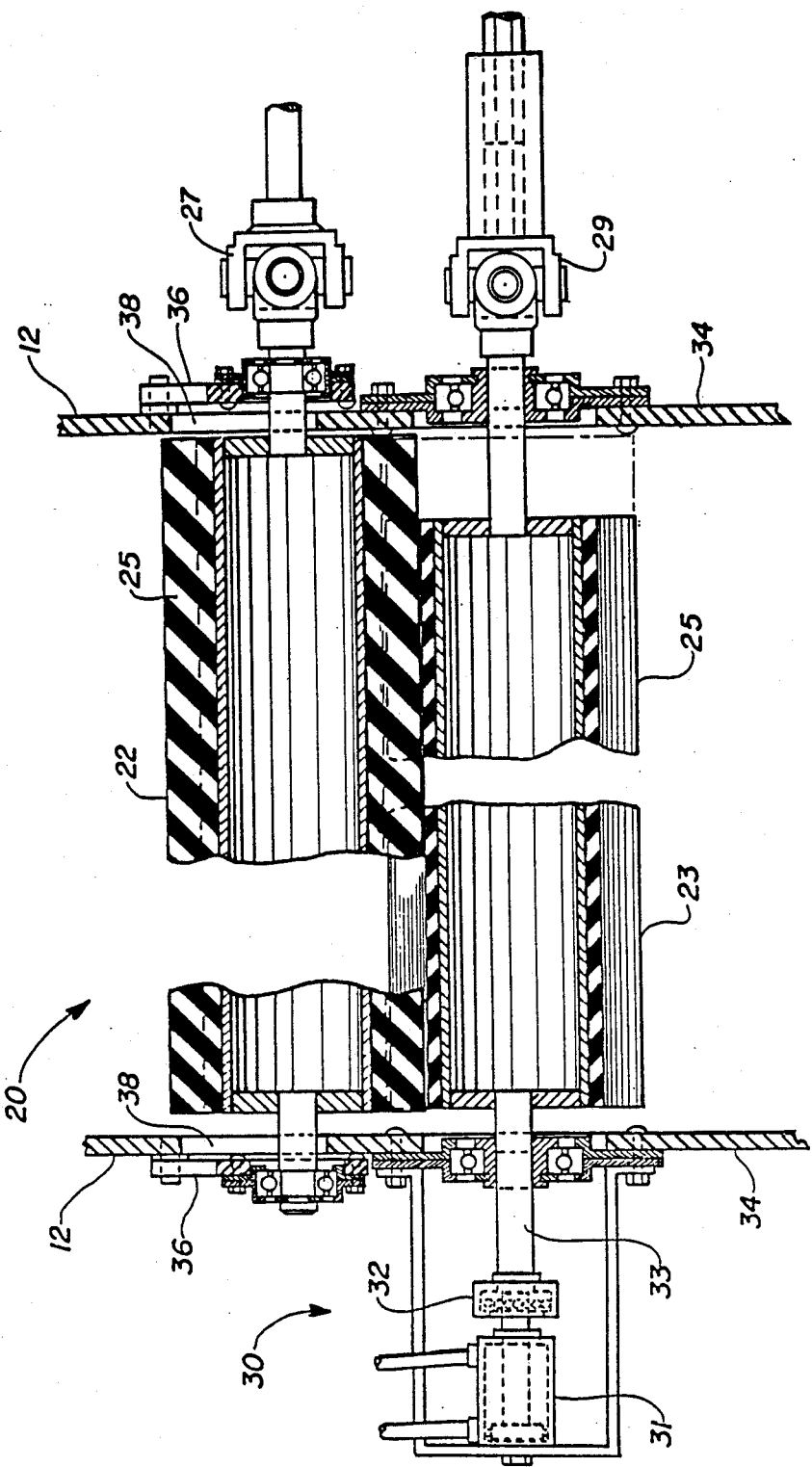
FIG. 3 is a partial cross-sectional view taken along lines 3—3 of FIG. 2 through the conditioning mechanism to show one embodiment of the reciprocating conditioning roll structure, each conditioning roll having the center portion broken away to facilitate the drawing thereof, the transverse reciprocal movement of the lower conditioning roll being shown in phantom.
Figure 4:
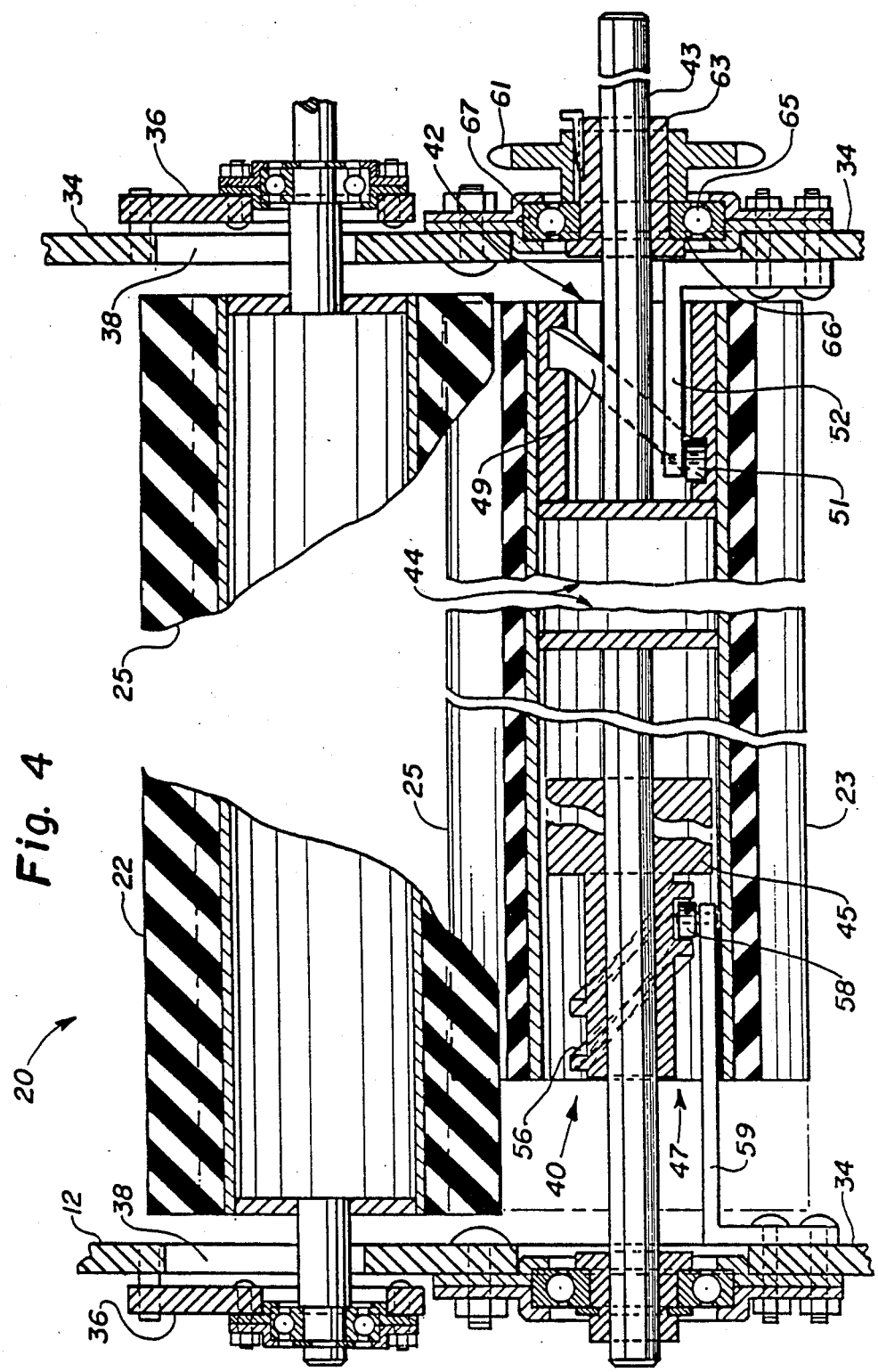
FIG. 4 is a partial cross-sectional view similar to that shown in FIG. 3 to depict a second embodiment of the reciprocating conditioning roll structure utilizing a counterweight, the transverse reciprocal movement of the lower conditioning roll being shown in phantom.

Referring now to FIG. 4, an alternative embodiment of the conditioning mechanism 20 can be seen. Similarly to the embodiment discussed in FIG. 3, only the lower conditioning roll 23 is reciprocated transversely and the upper conditioning roll 22 is mounted for conventional vertical movement relative to the lower conditioning roll 23. The oscillating mechanism 40, however, is in the form of a cam mechanism 42 operably associated with the lower conditioning roll 23 to effect the transverse linear movement of the lower conditioning roll 23 when the conditioning roll 23 is rotated by the drive mechanism 19 as depicted associated with a hex shaft 43 protruding outwardly from either end of the lower conditioning roll 23, as will be described in greater detail below. The lower conditioning roll 23 is provided with a hollow core 44 in which is located the oscillating mechanism 40 and a counterweight structure 45. The oscillating mechanism 40 also includes a second cam mechanism 47 operable to effect a transversely linear reciprocating movement of the counterweight 45 in opposition to the transverse movement of the lower conditioning roll 23 to provide a counterbalance and improve stability for the mower-conditioner 10.

Each of the cam mechanisms 42, 47 depicted in FIG. 4 includes a cam track 49, 56 inclined relative to the transversely extending axis of the lower conditioning roll 23. Each cam mechanism 42, 47 is also provided with a cam roller 51, 58 which is secured on a support arm 52, 59 attached rigidly to the respective side sheet 34 the frame 12 and engaged with the corresponding cam track 49, 56. The first cam mechanism 42 is shown with the cam track 49 affixed to the internal circumference of the core 44 of the lower roll 23. Since the cam roller 51 is fixed relative to the right side sheet 34 and since the entire lower roll 23 is mounted for movement transversely relative to the side sheet 34, the engagement between the cam roller 51 within the cam track 49 causes the transverse linear movement of the lower conditioning roll 23 when the lower conditioning roll 23 is rotated by the drive mechanism 19. The length of the stroke of reciprocating movement of the lower conditioning roll 23 is determined by the angle of inclination of the cam track 49 relative to the axis of the conditioning roll.

The counterweight mechanism 45 is slidably mounted on the hex shaft 43 to be rotatable therewith while permissive of transverse movement relative to the lower conditioning roll 23. The counterweight mechanism 45 is provided with a cam track 56 built-in. The angle of inclination of the cam track 56 is equal to, but opposite of, the angle of inclination of the cam track 49 of the first cam mechanism 42. Similar to the first cam mechanism 42, the second cam mechanism 47 is provided with a cam roller 58 mounted on a support arm 59 rigidly secured to the left side sheet 34 so that the distance between the cam roller 58 and the left side sheet 34 is fixed.

When the counterweight mechanism 45 is rotated with the hex shaft 43 and the lower conditioning roll 23, the engagement between the cam roller 58 and the cam track 56 effect a linearly transverse movement of the counterweight mechanism 45 along the hex shaft 43 in opposition to the transverse movement of the lower conditioning roll 23. Since the mass of the counterweight mechanism 45 is substantially equal to the mass of the lower conditioning roll 23, the oppositely moving masses of the counterweight 45 and the lower conditioning roll 23 counterbalance. One skilled in the art will readily realize that other cam mechanism configurations or wobble devices would be equally applicable and equally effective to cause an opposing transverse movement of the counterweight 45 and lower conditioning roll 23.

Continuing with reference to FIG. 4, the bearing mechanism for rotatably supporting the lower conditioning roll 23 for transverse reciprocal movement can best be seen. Rotational power to the lower conditioning roll 23 could be provided by a chain drive mechanism which would include a sprocket 61 cooperable therewith. A hex bore bushing support hub 63 is mounted on the hex shaft 43 to be rotatable therewith. The hex bore bushing 63 is pressed into the inner race 66 of a ball bearing 65 whose outer race 67 is secured to the side sheet 34 of the frame 12. As a result, the hex bore bushing 63 and hex shaft 43 are rotatably supported within the side sheet 34. The hex bore bushing 63 has an antifriction internal surface and provides a bushing area for the transverse linear reciprocating movement of the hex shaft 43. By incorporating the chain sprocket 61 into the body of the hex bore bushing 63, rotational drive imparted to the chain sprocket 61 by a drive chain (not shown) will be transferred directly to the hex shaft 43 to effect a rotative movement of the lower conditioning roll 23. Accordingly, a low cost bearing surface capable of accomodating both rotational and linearly reciprocating movement is provided.

Figure 5:
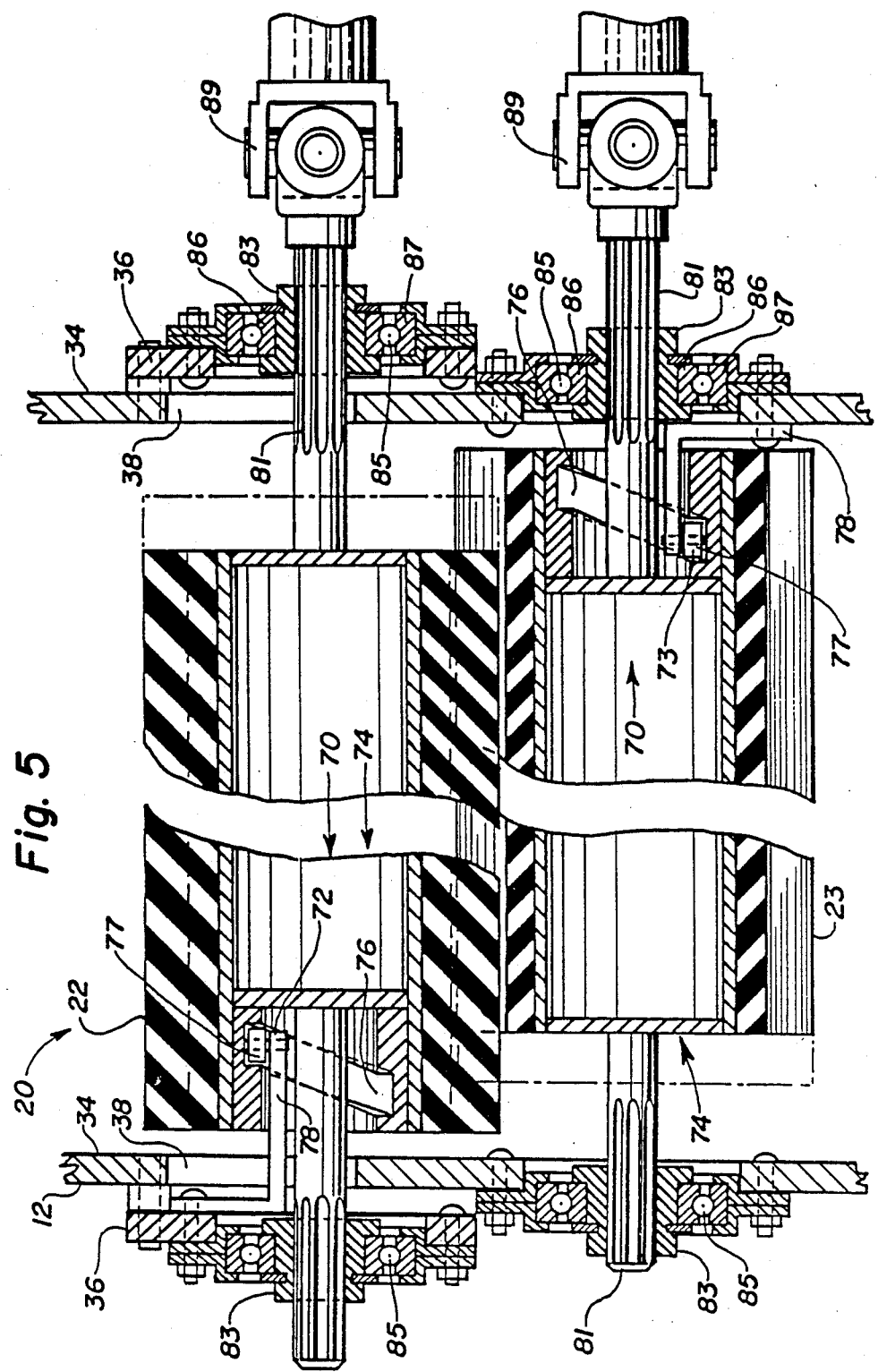
FIG. 5 is a partial cross-sectional view similar to that shown in FIG. 4 to depict a third embodiment of the reciprocating conditioning roll structure with both conditioning rolls being mounted for transverse reciprocal movement as shown in phantom.

Referring now to FIG. 5, a third embodiment of the reciprocating conditioning roll mechanism 20 can best be seen. Contrary to the embodiments described above relative to FIGS. 3 and 4, both the upper conditioning roll 22 and the lower conditioning roll 23 are reciprocated transversely relative to one another. The oscillating mechanism 70 is shown in the form of a cam mechanism 72 operatively associated with the upper conditioning roll 22 and a second cam mechanism 73 operatively associated with the lower conditioner roll 23. As noted above with respect to the oscillating mechanism 40, the first and second cam mechanisms 72, 73 include an inclined cam track 76 and an associated cam roller 77 mounted on a support arm 78 affixed to the respective side sheets 34 to provide reciprocal movement to the respective conditioning rolls 22, 23.

Because both the upper conditioning roll 22 and the lower conditioning roll 23 are being reciprocated equally, the angle of inclination of the cam track 76 is equal in both the cam mechanism 72, 73, but is only half of the angle of inclination required in the embodiment depicted in FIG. 4 to effect an identical amount of relative reciprocal movement. As described above with respect to the embodiment shown in FIG. 4, the cam mechanisms 72, 73 are housed within the core 74 of the conditioning rolls 22, 23. Because of the counterrotation of the respective rolls 22, 23, the angle of inclination of the cam track 76 on the cam mechanism 72, 73 is essentially identical but effect opposing reciprocating movement of the respective conditioning rolls 22, 23.

It would be preferable to place the cam track 76 on the cam mechanism 72 slightly out of phase with the cam track 76 of the cam mechanism 73 so that the reciprocal movement of the respective conditioning rolls 22, 23 is not exactly opposing, although nearly so. This out of phase alignment of the respective cam mechanisms 72, 73 would result in a continuous relative reciprocal movement of the conditioning mechanism 20, as compared to the dead spot encountered when the conditioning rolls 22,23 would reach the limit of reciprocation simultaneously if they were in phase.

FIG. 5 also depicts an alternative bearing arrangement for accomodating both rotational and reciprocal movements of the conditioning rolls 22, 23. Compared with the embodiment described above relative to FIG. 4, the shafts 81 corresponding to the respective conditioning rolls 22, 23 are splined and are slidably received within the splined corresponding bore of a bushing or support hub 83 rotatably mounted within the inner race 86 of a ball bearing 85 whose outer race 87 is secured to the applicable side sheet 34 of the frame 12. As a result, the bushing 83 is rotatable with the splined shaft 81 but, because of an antifriction internal surface engaged with the shafts 81 as described above relative to the support hub 63, also permits relative linear movement therebetween. Rotational power can be provided to the respective shafts 81 from the drive mechanism 19 coupled thereto with telescopic universal joint drive couplings 89.

Because of the need to provide generally vertical movement of the upper conditioning roll 22 relative to the lower conditioning roll 23, as described relative to the embodiment shown in FIG. 3 above, the bearings 85 and associated bushings 83 for the upper roll 22 must be carried by the respective swing arms 36 to facilitate the vertical movement while the upper conditioning roll 22 is being transversely reciprocated. Since the drive 19 is timed to the respective conditioning rolls 22, 23, the reengagement of the upper conditioning roll 22 with the lower conditioning roll 23 will be accomplished in proper intermeshing relationship.

Figure 8:
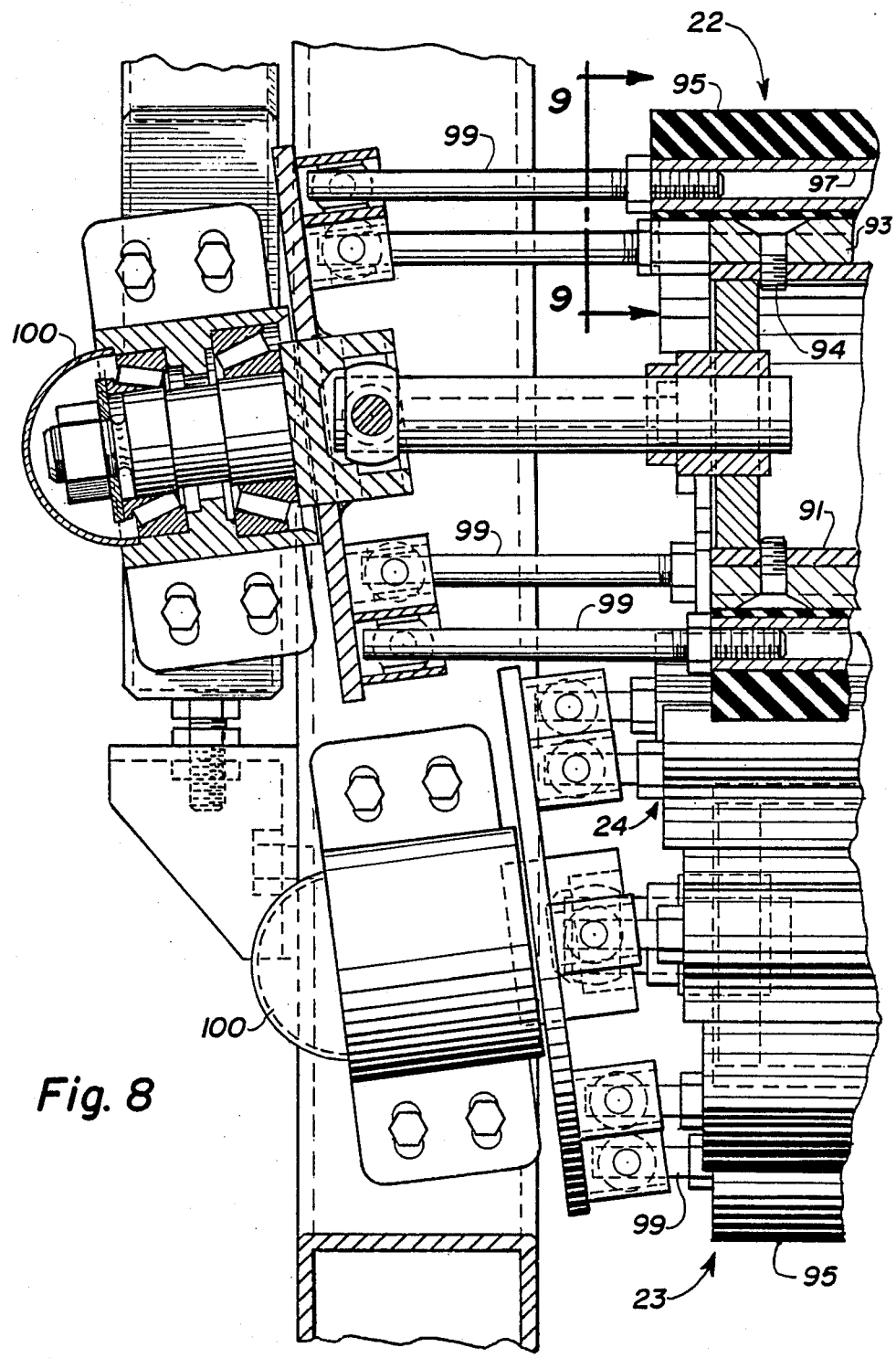
FIG. 8 is a partial cross-sectional view of an alternative embodiment of a conditioning mechanism in which individual lobes are transversely reciprocated to effect a conditioning action.
Figure 9:
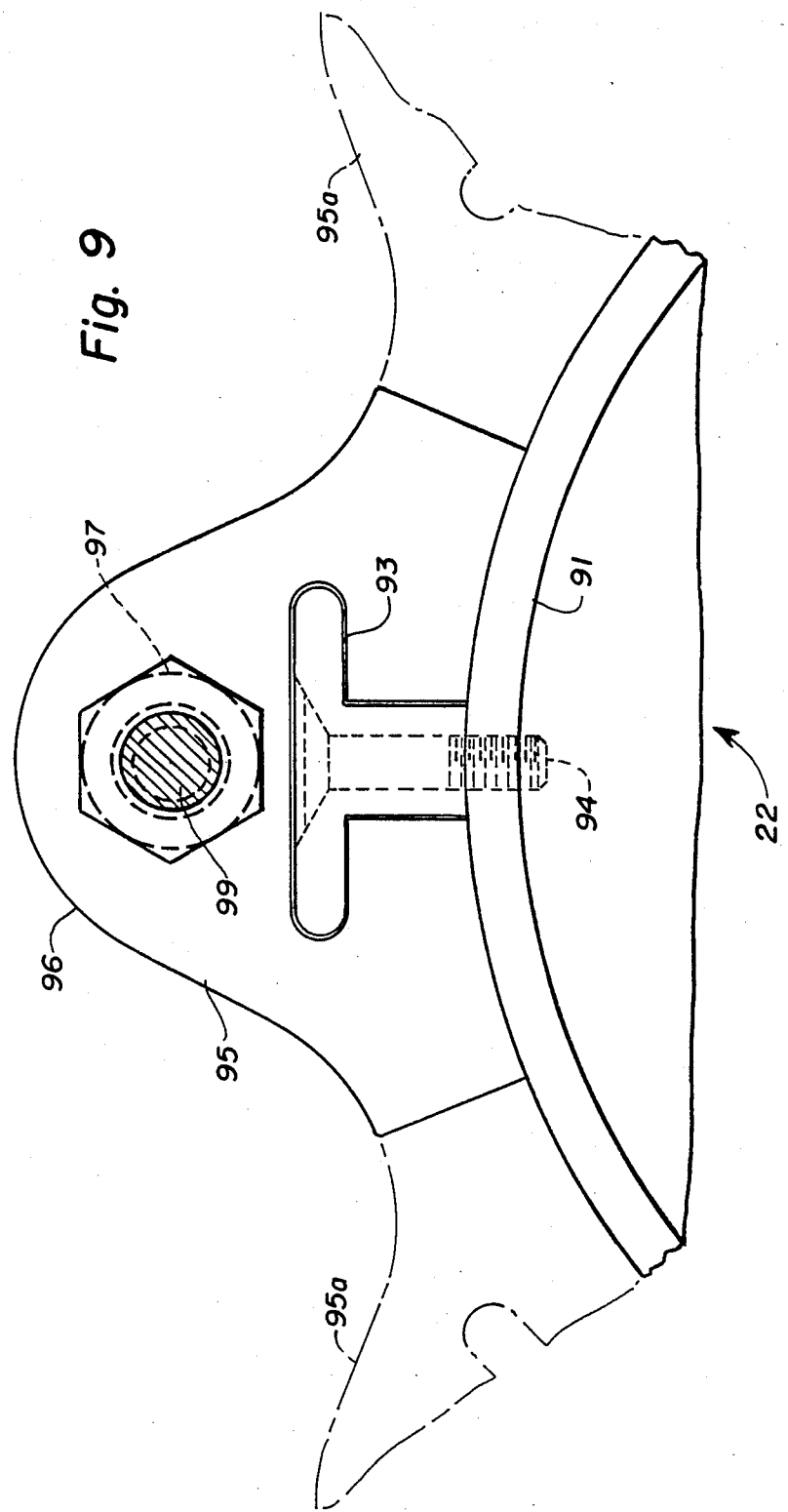
FIG. 9 is a cross-sectional view taken along lines 9—9 of FIG. 8 to depict a detail view of one of the individual lobes mounted for reciprocal movement.

Referring now to FIGS. 8 and 9, a further alternative embodiment of a conditioning mechanism providing transverse reciprocal movement effecting a conditioning of the crop material fed thereto can be seen. The conditioning rolls 22, 23 are constructed with a core 91 having a plurality of guide members 93 circumferentially affixed thereto and extending radially outwardly therefrom. The guide members 93 are shown as preferably having a T-shaped cross-sectional configuration and extending substantially along the entire transverse length of the core 91. The guide members 93 are preferably detachably affixed to the core 91 by threaded fasteners 94.

A lobe 95 is mounted on each respective guide member 93 for sliding movement relative thereto along the transverse length of the corresponding guide member 93. Each lobe 95 has an outer crop engaging surface 96 configured in an appropriate shape to permit intermeshing with the lobes 95 on the opposing counterrotating conditioning roll 22, 23. Although this outer surface 96 is shown as being arcuate, the shape can be configured alternatively as noted above. The intermeshing lobes 95 on the opposing conditioning rolls 22, 23 provide a generally conventional conditioning action along a line perpendicular to the transversely extending rolls 22, 23.

Each lobe 95 is constructed of an elastomeric material, such as urethane, bonded to a support tube 97. A connecting rod 99 interconnects each respective support tube 97 with a lobe reciprocating mechanism 100 operable to effect a transverse sliding movement of each respective lobe 95 along the guide member 93 corresponding thereto. Since each lobe 95 is transversely movable independently of each adjacent lobe 95a, the wobble mechanism can effect a transverse sliding movement without moving the core 91.

The lobe reciprocating mechanisms 100 corresponding to the conditioning rolls 22, 23 are phased so that at the point of intermeshing contact at the throat 24 the lobes 95 on the respective rolls are transversely moving in opposing directions and so that the lobes 95 are not changing direction of movement while in engagement with crop material within the throat 24. Further structural details of this particular conditioning mechanism can be found by reference to copending U.S. Patent Application Ser. No. 07/325,278, entitled "Reciprocating Lobed Conditioning Rolls", the descriptive portions of which are hereby incorporated by reference.

Figure 10:
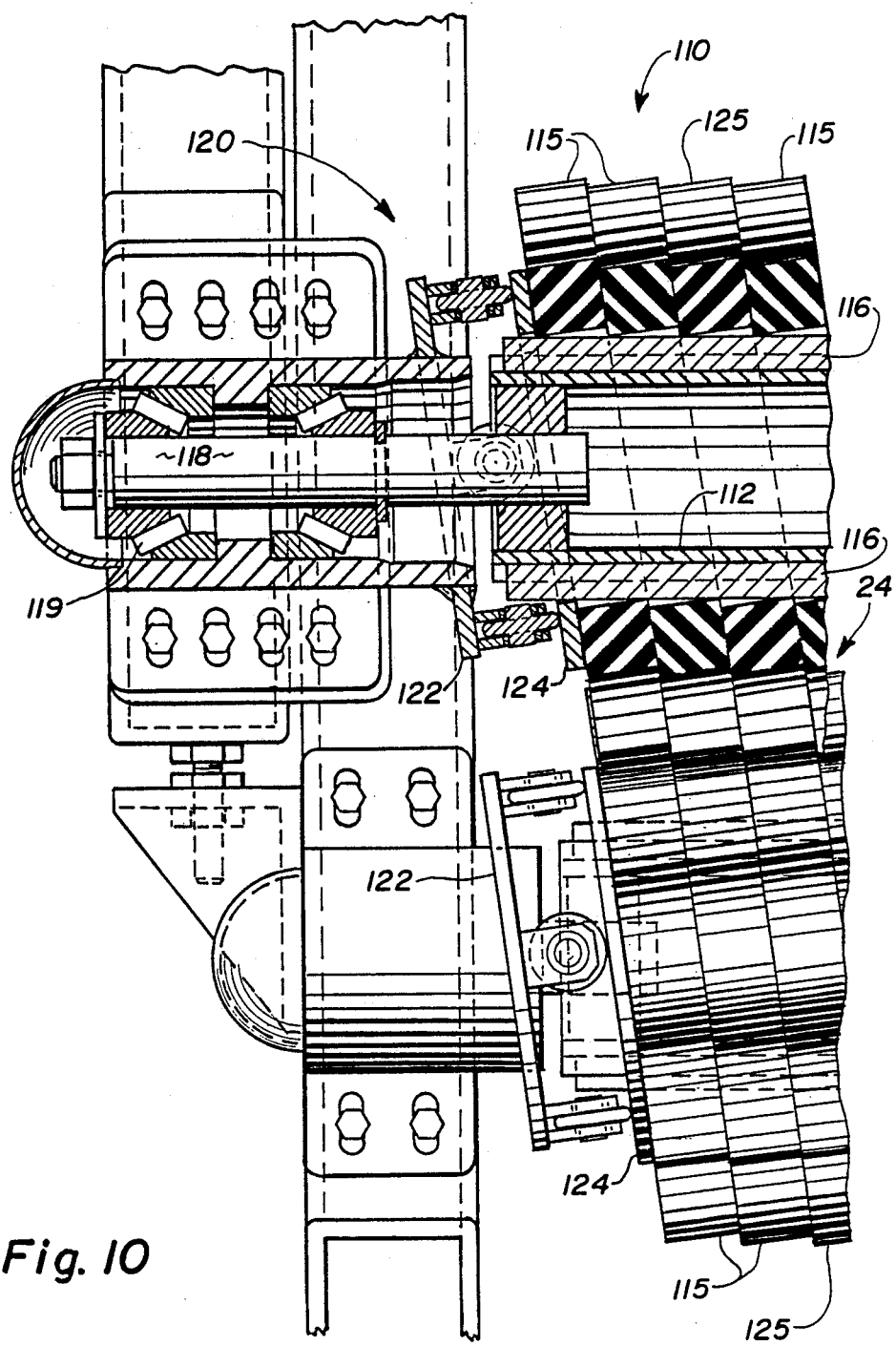
FIG. 10 is a partial cross-sectional view of yet another alternative embodiment of a conditioning mechanism incorporating the principles of the instant invention wherein the conditioning roll utilizes lobed rings oscillated by a mechanism to provide a transversely movable conditioning surface.

Referring now to FIG. 10, yet another alternative embodiment of a conditioning mechanism capable of operating the method of conditioning described below is shown. FIG. 10 is a view similar to that of FIG. 8 in that only the end of the conditioning mechanism is shown. A more detailed description of this particular mechanism can be found in copending U.S. Patent Application Ser. No. 07/324,792, entitled "Lobed Ring Conditioning Roll," filed concurrently herewith, the descriptive portions thereof being incorporated herein by reference.

The conditioning roll 110 is comprised of a hollow core 112 having a plurality of lobed rings 115 mounted thereon in a stacked configuration. A key 116 is affixed to the core 112 and engaged with the rings 115 to effect a rotation of the rings 115 with the core 112 about an axis of rotation defined by the support shaft 118 journaled by bearings 119 in a conventional manner.

An oscillating mechanism 120 in the form, for example, of a first canted member 122 stationarily fixed relative to rotations of the conditioning roll 110 effects an oscillating motion of the lobed rings 115 on the core 112 while the conditioning roll is being rotated. A wearplate 124 protects the lobed rings 115 for wear due to engagement with the oscillating mechanism 120. A second canted member (not shown) at the opposing end of the conditioning roll 110 keeps the lobed rings 115 compressed against the first canted member 122 to assure uniform oscillation of the lobed rings 115.

The oscillating mechanism 120 is phased so that the lobed rings do not change direction of movement while in the throat area 24 in conditioning engagement with crop material. The outer periphery 125 of the lobed rings 115 is moved transversely while being rotated with the core 112 to effect a more aggressive conditioning of the crop material according to the principles of the instant invention.

The most effective conditioning can be obtained by phasing the movements of the oscillating mechanism so that maximum transverse movement of the outer peripheral surface of the conditioning roll is in engagement with the crop material. The angular positioning of the oscillating mechanisms shown in FIGS. 8 and 10 relative to the axis of rotation of the conditioning rolls is shown as being representative. The precise angle and the relative phasing to create the transverse movement of the outer peripheral surface is dependent upon the orientation of the rolls relative to one another and the manner of conditioning desired, and can vary significantly from that shown in the drawings, so long as relative transverse movement between the conditioning rolls is attained within the throat area while in engagement with the crop material.

Accordingly, it can be seen from the descriptions of the conditioning mechanisms 20 described above that a method of conditioning forage crops, such as alfalfa and the like, has been disclosed. This method of conditioning utilizes the conventional crimping or crushing action of intermeshing, counterrotating conditioning rolls to condition the forage crop as it passes longitudinally through the conditioning mechanism 20 in addition to the sliding action attained by having relative transverse movement between the conditioning rolls to effect a more extensive, aggressive conditioning of the forage crop. This method of conditioning provides substantially continuous transverse conditioning of the forage crop to split substantially the entire stem of each individual plant while independently crushing or crimping the crop at regular intervals along a longitudinal direction.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. A method of conditioning forage crops by a conditioning mechanism having a pair of counterrotating conditioning rolls each of which has an outer peripheral surface forming a throat therebetween for the passage of said forage crop therethrough, comprising the steps of:

counterrotating said conditioning rolls;

simultaneously effecting relative transverse movement between the respective outer peripheral surfaces of said conditioning rolls by inducing a reciprocating transverse motion to the outer peripheral surface of at least one of said conditioning rolls while in engagement with said forage crop in said throat during the rotation of said at least one conditioning roll; and feeding said forage crops into said throat simultaneously with said counterrotating and effecting steps.

2. The method of claim 1 further comprising the step of:

compressing said forage crop by the passage of said forage crop between the opposing conditioning roll outer peripheral surfaces.

3. The method of claim 2 wherein said effecting step includes transversely moving one of said conditioning rolls relative to the other said conditioning roll.

4. The method of claim 3 wherein said effecting step includes transversely moving both said conditioning rolls in opposing directions.

5. The method of claim 4 wherein said effecting step includes opposingly reciprocating said conditioning rolls.

6. The method of claim 5 wherein said compressing step further includes the step of:

bending said forage crop by the interengagement of intermeshing undulating lobed outer peripheral surfaces of said conditioning rolls.

7. The method of claim 2 wherein said effecting step includes transversely moving individual lobes circumferentially spaced around one of said conditioning rolls.

8. The method of claim 7 wherein both said conditioning rolls have individual lobes slidably mounted around the circumference thereof, said effecting step including opposingly moving said lobes on the respective said conditioning rolls within said throat.

9. The method of claim 8 wherein said effecting step includes transversely moving said individual lobes during rotation thereof via connection of said lobes to a lobe reciprocating mechanism.

10. The method of claim 2 wherein said effecting step includes oscillating lobed rings mounted on a conditioning roll core so that the outer peripheral surface of said lobed rings is transversely reciprocated.

11. The method of claim 10 wherein said compressing step further includes the step of:

bending said forage crop by the interengagement of intermeshing lobed outer peripheral surfaces formed by said lobed rings on each respective conditioning roll.

12. A method of conditioning forage crops by the passage thereof between a pair of counterrotating conditioning rolls having an intermeshing undulating surface configurations comprising the steps of:

bending said forage crop along a longitudinal direction by the action of the intermeshing conditioning rolls; and simultaneously effecting an oscillating transverse movement of the outer peripheral surface of one of said conditioning rolls relative to the other said conditioning roll to cause a relative transverse sliding movement between said conditioning rolls and obtain a conditioning action on said forage crop along a transverse direction.

13. The method of claim 12 wherein said effecting step is accomplished by transversely reciprocating one of said conditioning rolls relative to the other said conditioning roll.

14. The method of claim 12 wherein said effecting step is accomplished by transversely moving individual lobes mounted circumferentially around a core while said conditioning roll is being rotated.

15. The method of claim 12 wherein said effecting step is accomplished by oscillating lobed rings mounted on a conditioning roll core while said conditioning roll is rotated.

* * * * *